(12) United States Patent
Woo et al.

(10) Patent No.: US 8,503,788 B2
(45) Date of Patent: Aug. 6, 2013

(54) INPUT-HANDWRITING AUTOMATIC TRANSFORMATION SYSTEM AND METHOD

(75) Inventors: Joo-Kyung Woo, Seoul (KR); Sun-Wha Chung, Yongin-si (KR); Byoung-Won Choe, Suwon-si (KR); In-Sik Myung, Incheon (KR); Shannu Jiang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1274 days.

(21) Appl. No.: 12/263,627

(22) Filed: Nov. 3, 2008

(65) Prior Publication Data

US 2009/0116744 A1    May 7, 2009

(30) Foreign Application Priority Data

Nov. 5, 2007    (KR) .................... 10-2007-0112113

(51) Int. Cl.
  *G06K 9/18*   (2006.01)
  *G06K 9/00*   (2006.01)
  *G06K 9/46*   (2006.01)

(52) U.S. Cl.
  USPC .......... 382/185; 382/186; 382/187; 382/188; 382/189; 382/190

(58) Field of Classification Search
  USPC ....................................... 382/185, 186, 187
  See application file for complete search history.

(56) References Cited

U.S. PATENT DOCUMENTS

| | | | |
|---|---|---|---|
| 6,094,506 A * | 7/2000 | Hullender | 382/186 |
| 6,421,461 B1 | 7/2002 | Arai et al. | |
| 7,302,099 B2 * | 11/2007 | Zhang et al. | 382/186 |
| 7,369,702 B2 * | 5/2008 | Abdulkader et al. | 382/187 |
| 7,454,063 B1 * | 11/2008 | Kneisl et al. | 382/187 |
| 7,848,573 B2 * | 12/2010 | Wecker et al. | 382/186 |
| 2001/0026262 A1 * | 10/2001 | Van Gestel et al. | 345/156 |
| 2005/0105799 A1 * | 5/2005 | Strohecker et al. | 382/186 |

FOREIGN PATENT DOCUMENTS

| | | |
|---|---|---|
| JP | 60-112187 | 6/1985 |
| JP | 09-044596 | 2/1997 |
| JP | 2003-517669 | 5/2003 |
| JP | 2007-52174 | 1/2007 |
| KR | 2001-44818 | 6/2001 |
| KR | 2005-10519 | 1/2005 |

OTHER PUBLICATIONS

NPL-MIT—Quantitative Foundations of Engineering Systems.*
Scott D. Connell et al., "*Writer Adaptation for Online Handwriting Recognition*," IEEE Transactions on Pattern Analysis and Machine Intelligence, vol. 24, No. 3, Mar. 2002, pp. 329-346.

(Continued)

*Primary Examiner* — Chan S Park
*Assistant Examiner* — Ha Le
(74) *Attorney, Agent, or Firm* — NSIP Law

(57) ABSTRACT

An input-handwriting automatic transformation system capable of automatically transforming handwriting input to a font most similar to the input handwriting, the system including a recognizing unit recognizing handwriting input via an input pad; an extracting unit extracting a font most similar to the input handwriting from fonts stored in a memory; and a transforming unit comparing the font extracted by the extracting unit and the input handwriting and automatically transforming the extracted font to be most similar to the input handwriting.

10 Claims, 8 Drawing Sheets

(56) References Cited

OTHER PUBLICATIONS

Zhouchen Lin et al., "*Style-preserving English handwriting synthesis,*" Pattern Recognition Society, accepted Nov. 2006, pp. 2097-2109.

Japanese Office Action issued Jun. 18, 2013 in counterpart Japanese Patent Application No. 2008-284386. (2 pages in Japanese).

* cited by examiner

INPUT-HANDWRITING AUTOMATIC TRANSFORMATION SYSTEM AND METHOD

CROSS-REFERENCE TO RELATED APPLICATION

This application claims all benefits accruing under 35 U.S.C. §119 from Korean Patent Application No. 2007-112113 filed on Nov. 5, 2007, in the Korean Intellectual Property Office, the disclosure of which is incorporated herein by reference.

BACKGROUND OF THE INVENTION

1. Field of the Invention

An aspect of the present invention relates to a handwriting input system, and, more particularly, to an input-handwriting automatic transformation system and method capable of automatically transforming handwriting input via a touch pad to a specific font.

2. Description of the Related Art

In recent years, handwriting input systems, for example, touch pads (ink pad) have been included in PDAs, wireless terminals, and the like to enable a user to directly input handwriting.

In general, if a user directly writes on a touch pad, a handwriting input system recognizes the input handwriting and displays the input handwriting. That is, the handwriting input system displays the handwriting input by the user without a transformation process.

However, if a user's hands shake when inputting handwriting, as shown in FIG. 1, distorted letters are displayed. This lowers user satisfaction with the handwriting input system.

Moreover, when the user inputs handwriting via a touch pad and the input handwriting is transformed into text which is stored in a system, the handwritten letters are aligned to have a standardized font size, and the user is unable to obtain feedback on the occurrence of an error during a data-conversion process.

SUMMARY OF THE INVENTION

An object of the invention is to provide an input-handwriting automatic transformation system and method capable of automatically transforming handwriting input by a user to a font most similar to the input handwriting.

Additional aspects and/or advantages of the invention will be set forth in part in the description which follows and, in part, will be obvious from the description, or may be learned by practice of the invention.

According to an aspect of the invention, there is provided an input-handwriting automatic transformation system including a recognizing unit recognizing handwriting input via an input pad; an extracting unit extracting a font most similar to the input handwriting from fonts stored in a memory; and a transforming unit comparing the font extracted by the extracting unit and the input handwriting and automatically transforming a shape of the extracted font to be most similar to a shape of the input handwriting.

According to another aspect of the invention, there is provided an input-handwriting automatic transformation method including recognizing handwriting input to an input pad; extracting a font most similar to the input handwriting from fonts stored in a memory; and comparing the extracted font and the input handwriting and automatically transforming the shape of the extracted font to be most similar to a shape of the input handwriting.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
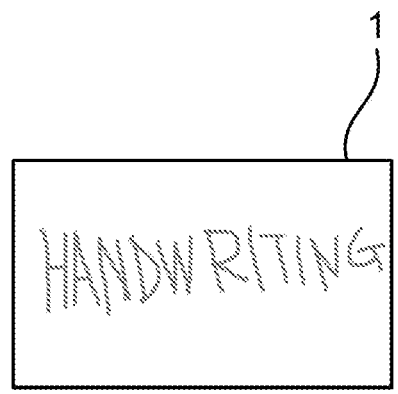
FIG. 1 is an exemplary diagram illustrating an example of displaying handwriting input to an ink pad of a handwriting input system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, an input-handwriting automatic transformation system and method according to an embodiment of the invention will be described in detail with reference to the accompanying drawings. In the embodiment of the invention, detailed description of known structures and functions incorporated herein will be omitted when it may make the subject matter of the invention unclear.

Figure 2:
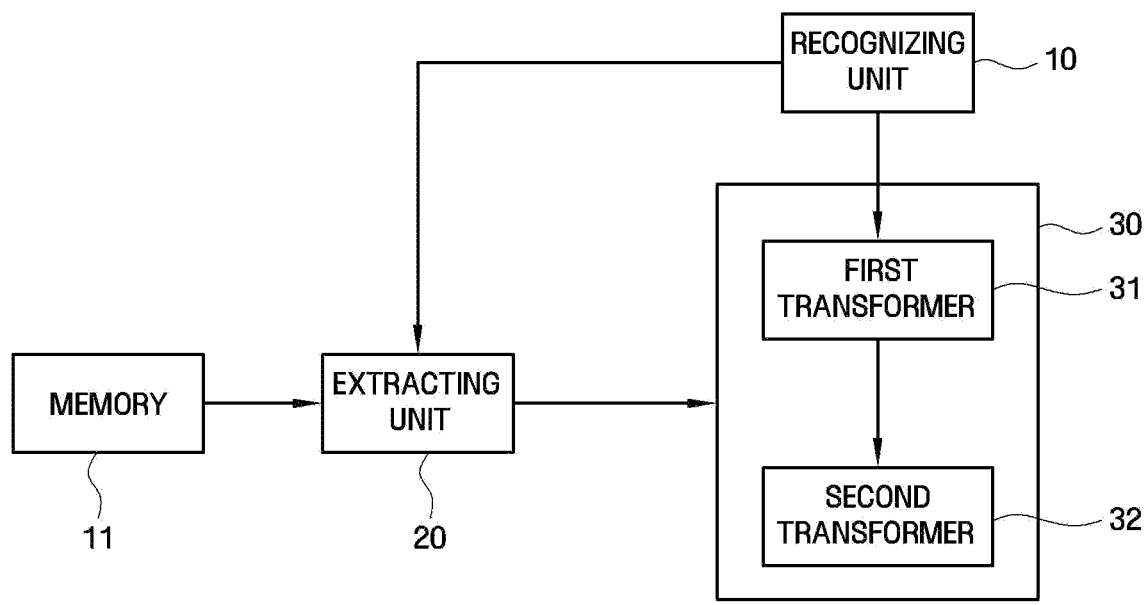
FIG. 2 is a block diagram illustrating a structure of an input-handwriting automatic transformation system according to an embodiment of the invention.

FIG. 2 is a block diagram illustrating a structure of an input-handwriting automatic transformation system according to an embodiment of the invention.

As shown in FIG. 2, an input-handwriting automatic transformation system (hereinafter, simply referred to as system) according to an embodiment of the invention includes a recognizing unit 10, an extracting unit 20, and a transforming unit 30.

The recognizing unit 10 recognizes handwriting which a user inputs via an input pad 1, for example, a touch pad.

Specifically, the recognizing unit 10 collects predetermined data on the input handwriting, for example, data information of important reference points and the number of strokes of the input handwriting, and recognizes the type of letters written by the user on the basis of font data stored in a memory 11. In this case, the important reference points include start points, end points, and bent points of the input handwriting at the coordinates of the input pad 1.

The extracting unit 20 acquires data information, such as fonts and important reference points corresponding to individual letters, stored in the memory 11, and extracts the font most similar to the data of the input handwriting from the fonts stored in the memory 11.

The transforming unit 30 compares the reference points of the font extracted by the extracting unit 20 and the input handwriting recognized by the recognizing unit 10 and automatically transforms the shape of the extracted font to be most similar to the shape of the input handwriting.

The transforming unit 30 includes a first transformer 31 and a second transformer 32.

The first transformer 31 transforms the overall shape of the extracted font to be most similar to the overall shape of the input handwriting.

Specifically, the first transformer 31 transforms the entire size and slope of the extracted font to be most similar to the entire size and slope of the input handwriting.

The second transformer 32 transforms the detailed shape of the extracted font to be most similar to the detailed shape of the input handwriting.

Specifically, the second transformer 32 transforms the length of each of strokes of the extracted font to be most similar to the length of each of strokes of the input handwriting.

Figure 3:
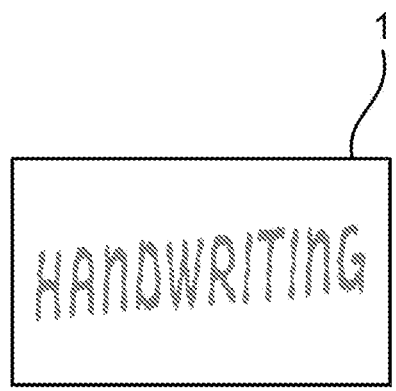
FIG. 3 is an exemplary diagram illustrating one example of automatically transforming and displaying handwriting input to an ink pad by an input-handwriting automatic transformation system according to an embodiment of the invention.

FIG. 3 is an exemplary diagram illustrating one example of automatically transforming and displaying handwriting input to an ink pad by an input-handwriting automatic transformation system according to an embodiment of the invention.

As shown in FIG. 3, if the user writes on a touch pad, based on the size and slope of the input handwriting, the system automatically transforms the font extracted from the memory 11 to have substantially the same size and slope as the input handwriting, and displays the corresponding letters in real time.

Hereinafter, an input-handwriting automatic transformation method according to the present embodiment of the invention will be described in detail with reference to FIGS. 4, 5A to 5E, and 6A to 6D.

Figure 4:
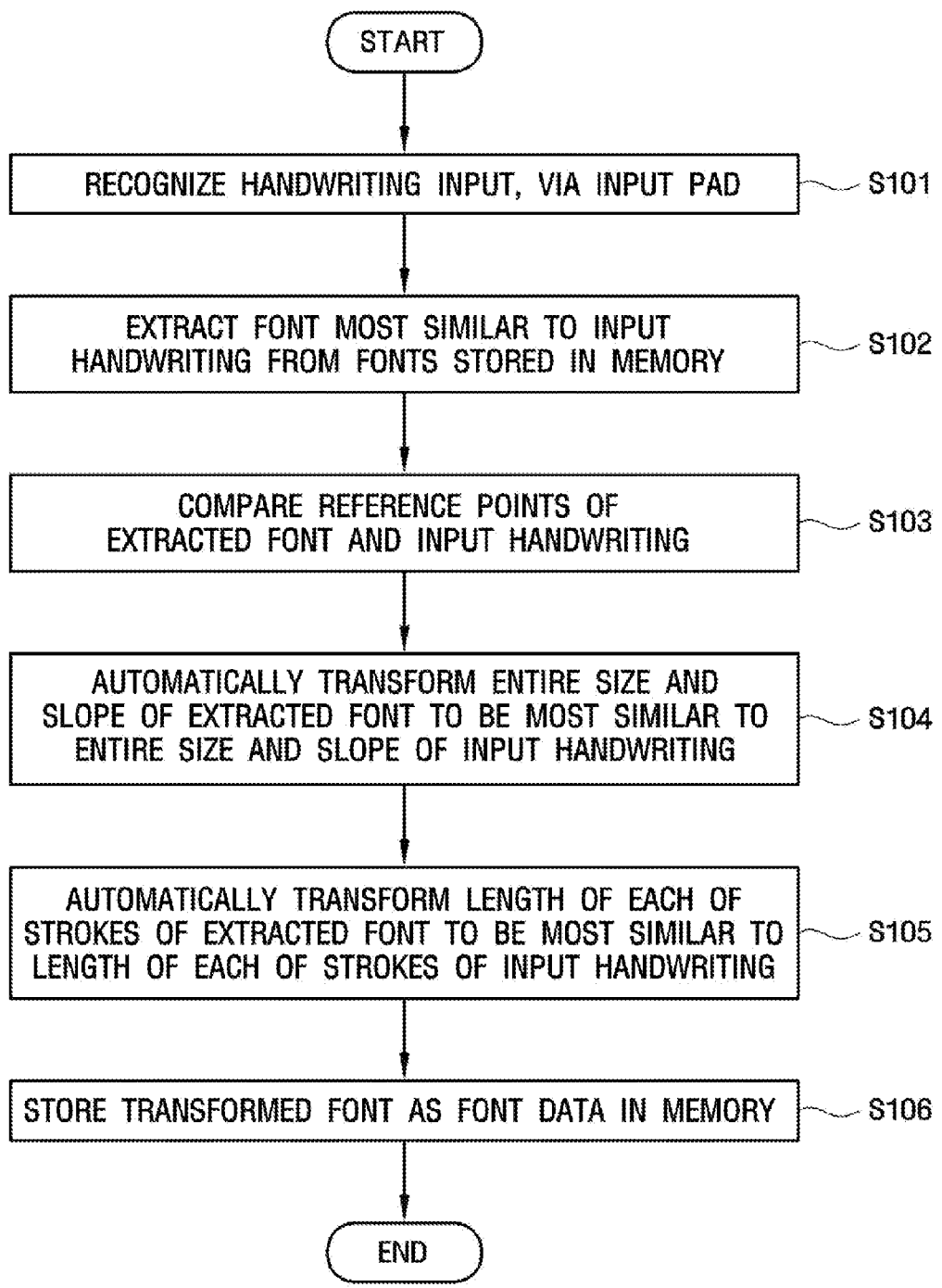
FIG. 4 is a flowchart illustrating an input-handwriting automatic transformation method according to an embodiment of the invention.

FIG. 4 is a flowchart illustrating an input-handwriting automatic transformation method according to an embodiment of the invention. FIGS. 5A to 5E are exemplary diagrams sequentially illustrating an example of a process of automatically transforming input handwriting by an input-handwriting automatic transformation method according to an embodiment of the invention.

Figure 5A:
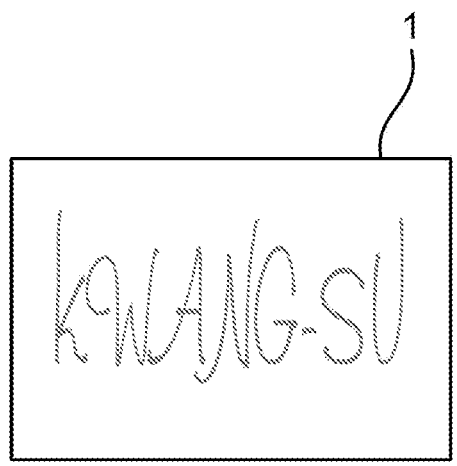
FIGS. 5A to 5E are exemplary diagrams sequentially illustrating an example of a process of automatically transforming input handwriting by an input-handwriting automatic transformation method according to an embodiment of the invention.

As shown in FIGS. 4 and 5A to 5E, in the input-handwriting automatic transformation method, if a user writes letters "KWANG-SU" on the input pad 1 in his/her own handwriting, the recognizing unit 10 recognizes the input handwriting (FIG. 4, Step S101 and FIG. 5A). Specifically, the recognizing unit 10 recognizes the handwriting as letters through data information on the important reference points and the number of strokes of the input handwriting. That is, the recognizing unit 10 recognizes the start points, the end points, and the bent points of the input handwriting at the coordinates of the input pad 1.

Figure 5B:
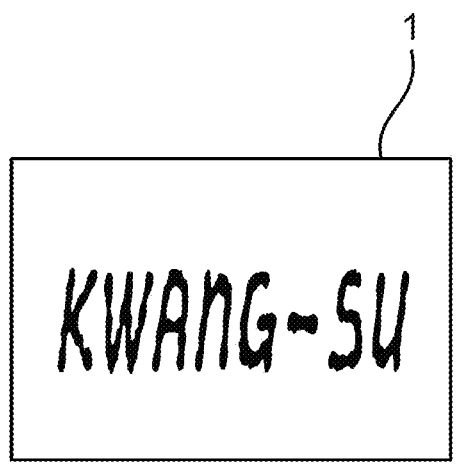

Then, the extracting unit 20 acquires data information, such as fonts and important reference points corresponding to individual letters, stored in the memory 11, and extracts the font most similar to the data of the input handwriting from the fonts stored in the memory 11 (FIG. 4, Step S102, and FIG. 5B).

Then, the transforming unit 30 compares the reference points of the extracted font and the input handwriting (Step S103), and automatically transforms the shape of the extracted font in real time to be most similar to the shape of the input handwriting.

Figure 5C:
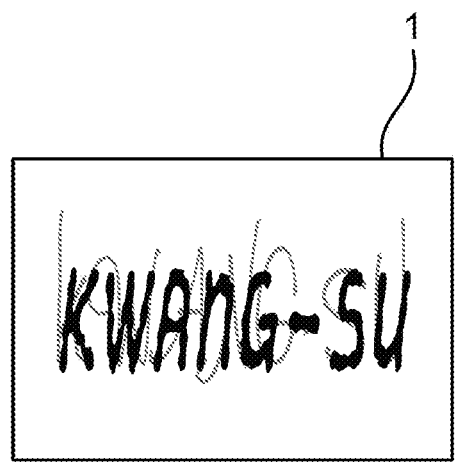

Specifically, the first transformer 31 transforms the overall shape of the extracted font to be most similar to the overall shape of the input handwriting. For example, the first transformer 31 transforms the entire size and slope of the extracted font to be most similar to the entire size and slope of the input handwriting (FIG. 4, Step S104, and FIG. 5C).

Figure 5D:
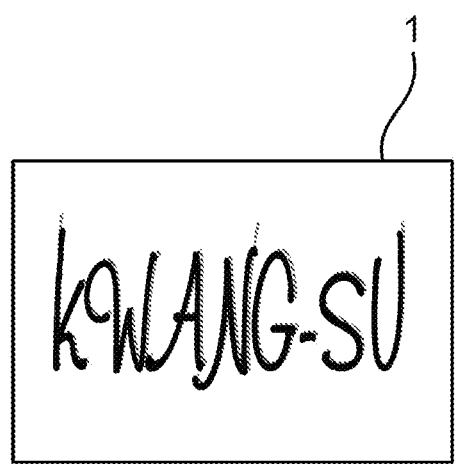
Figure 5E:
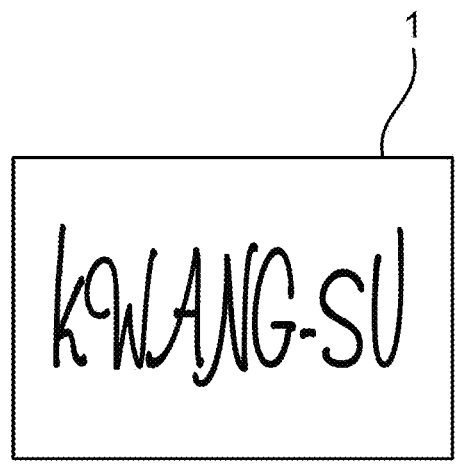

Then, the second transformer 32 transforms the detailed shape of the extracted front to be most similar to that of the input handwriting. For example, the second transformer 32 transforms the length of each of the strokes of the extracted font to be most similar to the length of each of the strokes of the input handwriting (FIG. 4, Step S105, and FIG. 5D).

Preferably, the transformed font (FIG. 4, Step S106 and FIG. 5E) is stored in the memory 11 to enable using the font when creating a message using a mobile communication terminal or any other device in which handwriting is input, thereby constructing a database of fonts.

FIGS. 6A to 6D are exemplary diagrams sequentially illustrating one example of a process of simultaneously transforming the entire input handwriting with a designated font using an input-handwriting automatic transformation method according to an embodiment of the invention.

Figure 6A:
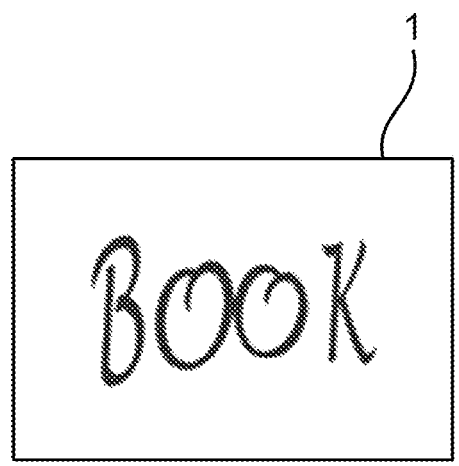
FIGS. 6A to 6D are exemplary diagrams sequentially illustrating one example of a process of simultaneously transforming the entire input handwriting to a designated font using an input-handwriting automatic transformation method according to an embodiment of the invention.
Figure 6B:
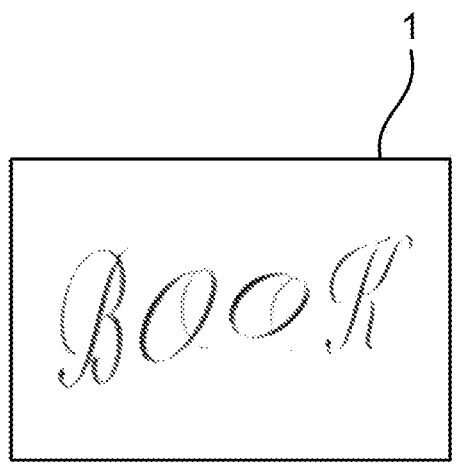
Figure 6C:
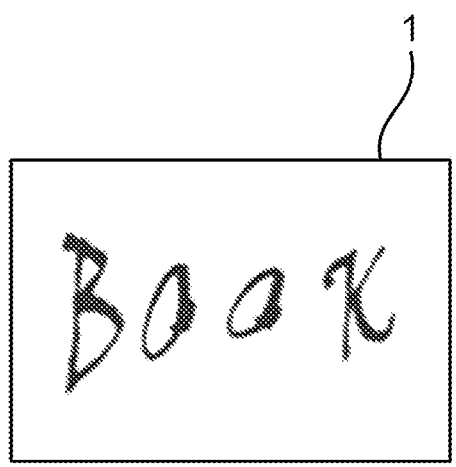
Figure 6D:
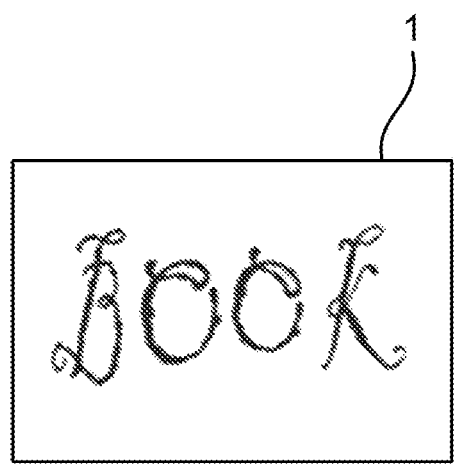

All letters of the input handwriting "BOOK" shown in FIG. 6A can be simultaneously transformed with a newly designated font, as shown in FIGS. 6B, 6C, and 6D.

That is, according to the embodiment of the invention, if the user inputs handwriting through the touch pad, the handwriting is automatically transformed into the shape of the specific font in real time and displayed. As a result, the user can input handwriting using a specific font. Therefore, it is possible to improve the usefulness of the handwriting input.

As described above, according to the input-handwriting automatic transformation system and method according to the embodiment of the invention, the following effects can be achieved.

First, the handwriting input by the user is automatically transformed into the type of font most similar to the input handwriting. As a result, the user can input the handwriting using a popular font. Therefore, it is possible to improve handwritten input.

Second, the user can use a font that is similar to his or her handwriting without separate processes, such as planarizing and standardizing processes. Therefore, it is possible to improve the user friendliness of a device.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. An input-handwriting automatic transformation system comprising a display device, the system comprising:
   a recognizer configured to recognize handwriting input via an input pad based on data information of reference points comprising start points, end points, and bend points of the input handwriting;
   an extractor configured to extract a font most similar to the input handwriting from fonts stored in a memory; and
   a transformer configured to compare the font extracted by the extractor and the input handwriting, and automatically transform a shape of the extracted font to be most similar to a shape of the input handwriting, wherein the transformer comprises
      a first transformer transforming an overall shape of the extracted font to be most similar to an overall shape of the input handwriting, and
      a second transformer transforming a detailed shape of the extracted font to be most similar to a detailed shape of the input handwriting, and, upon the completion of the transforming of the first transformer, transforming a length of each of strokes of the extracted font to be most similar to a length of each of strokes of the input handwriting.

2. The input-handwriting automatic transformation system of claim 1, wherein the recognizer recognizes the input handwriting as letters based on the data information of the reference points and a number of strokes of the input handwriting.

3. The input-handwriting automatic transformation system of claim 1, wherein the first transformer transforms an entire size and slope of the extracted font to be most similar to an entire size and slope of the input handwriting.

4. An input-handwriting automatic transformation method comprising:
   recognizing handwriting input via an input pad based on data information of reference points comprising start points, end points, and bend points of the input handwriting;
   extracting a font most similar to the input handwriting from fonts stored in a memory; and
   comparing the extracted font and the input handwriting and automatically transforming the extracted font to be most similar to the input handwriting,
   wherein the comparing of the extracted font and the input handwriting and the automatic transforming of the shape of the extracted font to be most similar to the shape of the input handwriting comprises
      transforming an overall shape of the extracted font to be most similar to an overall shape of the input handwriting, and
      transforming a detailed shape of the extracted font to be most similar to a detailed shape of the input handwriting, after transforming the overall shape of the extracted font, and
   wherein, after the transforming of an overall shape of the extracted font, the transforming of the detailed shape of the extracted font to be most similar to the detailed shape of the input handwriting comprises transforming a length of each of strokes of the extracted font to be most similar to a length of each of strokes of the input handwriting.

5. The input-handwriting automatic transformation method of claim 4, wherein the recognizing of the handwriting input via the input pad includes recognizing the input handwriting as letters based on the data information on the reference points and a number of strokes of the input handwriting.

6. The input-handwriting automatic transformation method of claim 4, wherein the transforming of the overall shape of the extracted font to be most similar to the overall shape of the input handwriting comprises transforming an entire size and slope of the extracted font to be most similar to an entire size and slope of the input handwriting.

7. The input-handwriting automatic transformation method of claim 4, further comprising:
   storing a transformed font as font data in the memory to allow use of the font when creating a message.

8. The input-handwriting automatic transformation system of claim 1, wherein the transformed extracted font is stored in the memory as font data.

9. An input-handwriting transformation apparatus comprising a display device, the apparatus comprising:
   a recognizer configured to recognize handwriting input via an input pad based on data information of reference points comprising start points, end points, and bend points of the input handwriting;
   an extractor configured to extract a font corresponding to the input handwriting from fonts stored in a memory; and
   a transformer configured to compare the font extracted by the extractor and the input handwriting, transform a size and slope of the extracted font to correspond to a shape of the input handwriting, and transform a length of each stroke of the extracted font to correspond to a length of each stroke of the input handwriting, wherein the transformer comprises
      a first transformer transforming an overall shape of the extracted font to correspond to an overall shape of the input handwriting, and
      a second transformer transforming a detailed shape of the extracted font to be most similar to a detailed shape of the input handwriting, and, upon the completion of the transforming of the first transformer, transforming a length of each of strokes of the extracted font to be most similar to a length of each of strokes of the input handwriting.

10. The input-handwriting automatic transformation apparatus of claim 9, wherein the recognizer recognizes the input handwriting as letters based on the data information of the reference points and a number of strokes of the input handwriting.

* * * * *